United States Patent [19]

Liebert et al.

[11] 4,355,505

[45] Oct. 26, 1982

[54] ROTATABLE CONTROLLER VALVE

[75] Inventors: Karl-Heinz Liebert, Schwabisch Gmund; Werner Tischer, Bobingen, both of Fed. Rep. of Germany

[73] Assignee: Zahnradfabrik Friedrichshafen, AG, Friedrichshafen, Fed. Rep. of Germany

[21] Appl. No.: 136,471

[22] Filed: Apr. 2, 1980

[30] Foreign Application Priority Data

Apr. 28, 1979 [DE] Fed. Rep. of Germany ....... 2917298

[51] Int. Cl.³ ............................................. F15B 13/04
[52] U.S. Cl. .................................. 60/384; 137/625.68; 137/625.69; 418/61 B
[58] Field of Search ...................... 60/384; 137/625.68, 137/625.69; 418/61 B; 180/132

[56] References Cited

U.S. PATENT DOCUMENTS

| 21,682 | 10/1858 | Jobin | 137/625.68 |
|---|---|---|---|
| 149,019 | 3/1874 | Witty | 137/625.68 |
| 3,385,057 | 5/1968 | Pruvot et al. | |
| 3,862,645 | 1/1975 | Bianchetta et al. | 137/625.68 X |
| 3,937,601 | 2/1976 | Miller | 418/61 B |

FOREIGN PATENT DOCUMENTS

| 1480720 | 6/1969 | Fed. Rep. of Germany . |
| 1550557 | 9/1969 | Fed. Rep. of Germany . |
| 2511308 | 9/1975 | Fed. Rep. of Germany . |
| 2718148 | 10/1978 | Fed. Rep. of Germany . |

*Primary Examiner*—Gerald A. Michalsky
*Attorney, Agent, or Firm*—Zalkind & Shuster

[57] ABSTRACT

Axially spaced distributor grooves externally formed on a rotatable controller valve element conduct pressurized fluid to a servomotor in response to axial displacement of the valve element within a housing enclosing pressurized spaces to which opposite axial ends of the valve element are exposed. Flow of the pressurized fluid through the grooves is controlled by slide valve surfaces on the valve element axially between the pressurized spaces and the grooves.

8 Claims, 3 Drawing Figures

ROTATABLE CONTROLLER VALVE

BACKGROUND OF THE INVENTION

This invention pertains to a hydrostatic controller for a vehicle power steering system of the type including a metering device and a rotatable valve element controlling the flow of fluid through the metering device to a servomotor, and is related to the invention disclosed in the copending application of Werner Tischer, Ser. No. 136740, filed Apr. 2, 1980, and owned by the same assignee common to the present application.

The arrangement of longitudinal distributor grooves on the rotatable valve element associated with the foregoing type of hydrostatic controller, makes possible precision controlled distribution of pressure medium with minimal leakage losses from the fluid displacing pockets of the metering device and the pressure chambers of the servomotor. Such arrangements are disclosed, for example, in German Patent Nos. OS 25 11 308 and 14 80 720, and in U.S. Pat. No. 3,937,601. In such prior art arrangements, the axial ends of the rotatable valve element are shouldered to serve as axial thrust bearings in the valve housing. Such shouldered ends must be of a predetermined axial length to provide adequate bearing support and accordingly extend the axial length of the valve element. Because of the extremely high pressures that sometimes prevail in the chambers to which the shouldered ends of the valve element are exposed, hydraulic jamming of the valve element may occur. A major disadvantage, however, of such exposure of the shouldered ends of the valve element resides in the differential pressures exerted thereon resulting in high leakage losses. These leakage losses become especially critical in current power steering systems wherein operating pressures are increased by about 70% as compared to earlier power steering systems. The leakage losses are increased because of the low return pressure prevailing in the interior of the valve element externally exposed to a high operating pressure along a major portion of its axial length. Thus, leakage gaps between the housing and the valve element result from the tendency of the valve element to experience a reduction in diameter under pressure while the sealing diameter of the housing is enlarged. An increase in leakage volume as a third power of the sealing gap dimension is indicative of the problem involved.

Further, as a result of the pressure differential between the operating pressure acting externally on the valve element and its low internal return pressure, high leakage losses occur between the housing and the manually operable metering pump device. The pressure differential may also cause hydraulic jamming of the rotor in the metering pump device against confronting surfaces of its enclosure. Such problems are dealt with in some prior art arrangements as disclosed in German Patent No. OS 15 50 557 and U.S. Pat. No. 3,385,057, wherein pressurized fluid is supplied from the servopump to the controller through the central axial bore. As a result, the pressure differential between the internal and external surfaces of the valve element is avoided. However, pressure differentials at the axial end bearings of the valve element still prevail to cause hydraulic jamming. Since installational requirements for such power steering controllers limit axial dimensions and because of the axial shift thereof, the axial lengths of the shouldered end portions of the valve element are insufficient to provide adequate bearing support. Further, the latter mentioned prior art arrangement involves both a radially outer sleeve valve to control distribution and a separate radially inner valve to regulate pressure and control reversal of flow. The use of two separate valves makes for a more expensive controller assembly.

It is therefore an important object of the present invention to provide a single, one-piece rotatable controller valve for power steering systems of the aforementioned type which will avoid the disadvantages and problems associated therewith as hereinbefore indicated.

A further object in accordance with the foregoing object is to provide a relatively short axial controller valve undergoing both axial and angular displacement which will have adequate bearing support in the housing and operate with minimal leakage losses and without hydraulic lock or jamming.

SUMMARY OF THE INVENTION

In accordance with the present invention, a rotatable control valve element for a hydrostatic vehicle steering system is provided with distributor grooves formed adjacent opposite axial ends thereof on its radially outer surface, such grooves being in fluid communication with axial passages in the valve housing by means of connecting bores disposed at an angle to the axis of the internal valve bore of the housing from which the connecting bores extend. The distributor grooves at opposite ends of the valve element render the axial end portions of the valve element suitable for bearing support in the valve housing and form slide valve surfaces controlling flow of fluid under operating pressure to pressure spaces at the axial ends of the valve element and to the outlet ports. The external distributor grooves conduct pressurized fluid delivered either from the servopump or from the metering pump device, which is substantially equal to the operating pressure in either case to avoid any differential pressures on the axial end bearing portions of the valve element and preclude thereby any hydraulic locking action. The axial dimension of the valve element is therefore determined only by its flow controlling function resulting in an axially shorter valve element as compared to prior art controllers. Despite such shorter length of the valve element, the volume of leakage fluid is reduced.

Also, internal and external pressures on the valve element are equalized by establishment of fluid communication between the internal bore of the valve element and the supply passage in the valve housing, thereby avoiding deformation of the valve element by varying pressure loads.

BRIEF DESCRIPTION OF THE DRAWING FIGURES

Other objectives of the invention and additional advantageous features will become apparent from the description set forth hereinafter in more detail on the basis of a specific embodiment as shown in the accompanying drawings, wherein.

DETAILED DESCRIPTION OF PREFERRED EMBODIMENT

Figure 1:
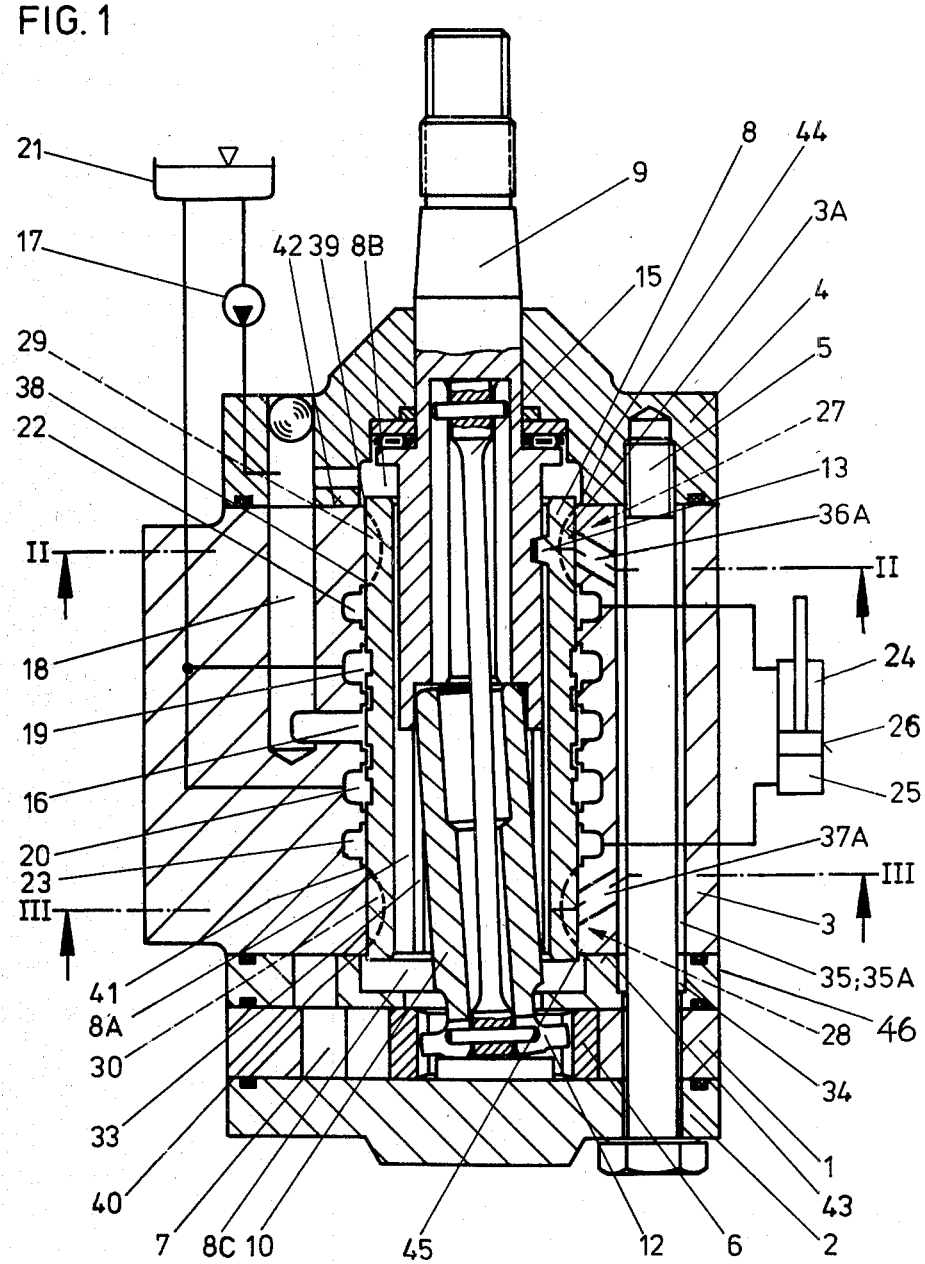
FIG. 1 is a longitudinal side section view through a hydrostatic controller associated with a power steering system illustrated schematically.
Figure 2:
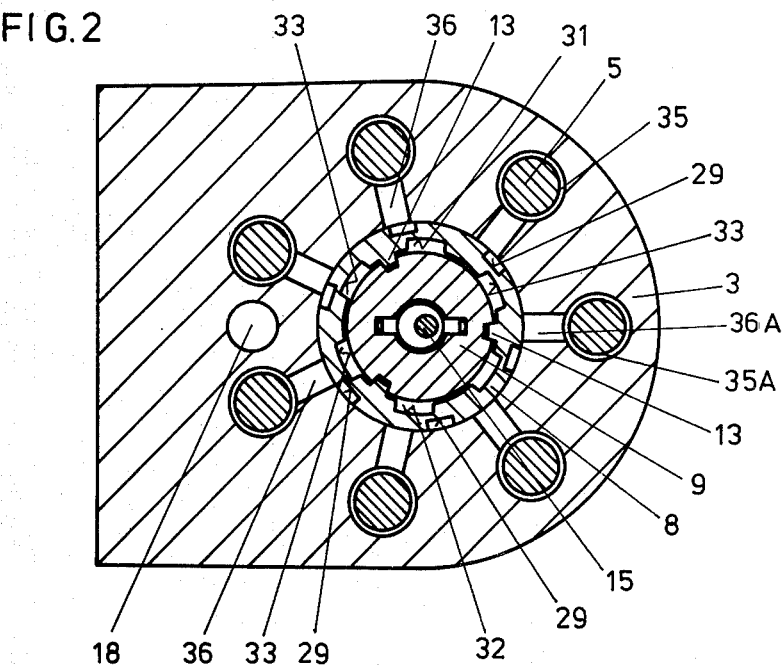
FIG. 2 is a transverse section view taken substantially through a plane indicated by Section line II—II in FIG. 1.

Referring now to the drawings in detail, FIG. 1 illustrates a hydrostatic controller adapted for use with a hydrostatic steering system for a motor vehicle. The controller includes at one axial end a fluid metering device having an internally toothed stator gear 1 disposed between an end cover 2 and an axial spacer 46. The end cover, stator gear and spacer are interconnected with and held assembled on one axial end of a tubular valve housing 3 by screw fasteners 5 which extend through axial bores 35. Also connected to the housing 3 at the opposite axial end by means of the fasteners 5, is a cover 4. The fluid metering device also includes an externally toothed rotor gear 6 in mesh with and having one tooth less than the toothed stator gear 1. Expanding and contracting fluid displacing pockets 7 are formed between the teeth of the gears 1 and 6 and between the confronting surfaces of the cover 2 and the end of the housing 3 adjacent the gear 6.

Figure 3:
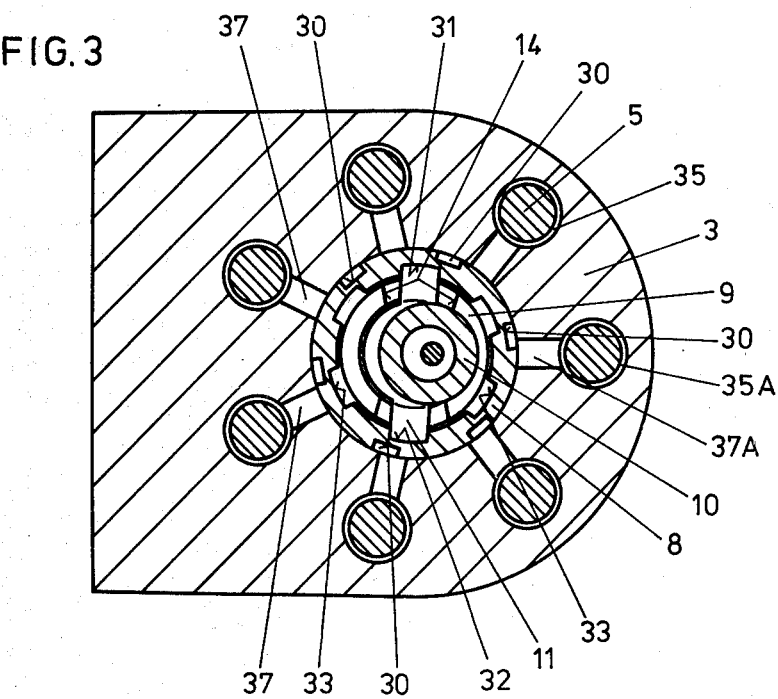
FIG. 3 is a transverse section view taken substantially through a plane indicated by Section line III—III in FIG. 1.

The housing 3 is formed with an internal valve bore 3A rotatably mounting a rotatable slide valve element 8 of tubular construction in coaxial relation to a drive shaft 9 extending axially from the cover 4. The valve element 8 is torsionally connected to the rotor gear 6 by a hinge coupling in the form of a universal joint shaft 10. Two driving pins 11 and 12 as respectively shown in FIGS. 3 and 1, establish a jointed connection between gear 6, universal joint shaft 10 and valve element 8 in order to control operation of the fluid metering device in response to angular displacement of the valve element as is well known in the art. The valve element is axially shiftable relative to the drive shaft 9 to control fluid flow in response to relative angular movement of drive shaft 9 by virtue of a coarse-pitched threaded connection 13. Relative angular displacement between the drive shaft 9 and valve element 8 is limited by stops 14 as shown in FIG. 3 to impart angular displacement to the valve element by continued rotation of the drive shaft as is well known in the art. A torsion spring rod 15, pinned at opposite longitudinal ends to the drive shaft 9 and the universal joint shaft 10 as shown in FIG. 1, centers the valve element 8.

The housing 3 and the valve element 8 interact to regulate the pressure and distribution of a pressurized medium. A center inlet port 16 formed in the housing is connected to a servomotor pump 17 associated with the hydrostatic steering system from which the pressurized medium is received. The pressurized medium is thereby supplied to the internal bore 3A of the housing by a supply passage 18 interconnected between the pump 17 and the inlet port 16. The housing 3 also encloses spaces or pressure chambers 8B and 8C adjacent opposite axial ends of the valve element in fluid communication with the supply passage 18. Two fluid return ports 19 and 20 spaced adjacent to the inlet port 16 are connected to a reservoir tank 21 for the pressure medium. One of two annular outlet ports 22 and 23 spaced adjacent to the return ports 19 and 20, is connected with one of two pressure chambers 24 and 25 of a servomotor 26 associated with the hydrostatic steering system. Annular grooves are formed externally in the radially outer surface of valve element 8 in a well known manner so that in a neutral position of the valve element an almost pressureless circulation of the pressure medium occurs between the servopump 17 and the reservoir tank 21, while in an axially shifted steering position of the valve element 8, such free circulation is blocked and one of the two outlet ports 22 and 23 is in fluid communication with one of the two return ports 19 and 20. The valve element 8 thus functions through its flow passage systems to control the flow of pressure medium from pump 17 through the metering device to the servomotor 26 for power steering purposes in a manner generally well known in the art.

Two flow passage systems 27 and 28 respectively including longitudinal distributor grooves 29 and 30 are formed externally in the radially outer surface of valve element 8 at the opposite axial ends thereof. The longitudinal distributor grooves are limited axially in both axial directions and form valve edges which cooperate with housing grooves adjacent thereto. The longitudinal distributor grooves 29 and 30 are angularly spaced from each other by one-half the angular spacing between the internal teeth of the stator gear. On its radially inner surface, the valve element 8 is formed with two continuous longitudinal grooves 31 and 32 necessary for reception of the drive pin 11 and continuous fluid passage grooves 33 for conducting the pressure medium from the supply passage 18 to the longitudinal distributor grooves 30 of one of the systems 28.

Both longitudinal distributor grooves 29 and 30 are blocked in the neutral position of the valve element 8 while end spaces 8B and 8C are under the low circulation pressure. In the steering positions of the valve element, the longitudinal grooves 29 are in fluid communication with the supply passage 18 through the end spaces, or the servomotor outlet port 22 depending on the direction of steering, while the longitudinal distributor grooves 30 are in fluid communication with the outlet port 23 or the supply passage 18. Fluid communication between the expanding and contracting pockets 7 in the metering device and the longitudinal distributor grooves 29 and 30 is established by passages 34 in the spacer 46, axial passages 35 in the housing through which the fasteners 5 extend and two systems of connecting passages 36 and 37. The formation of the passages 34 and axial passages 35 is already known as disclosed in German Patent No. OS 2,718,148 so that no detailed description thereof is set forth herein. The number of axial passages 35 corresponds to the number of gaps between the teeth of the stator gear 1 with which the pockets communicate. The connecting passages 36 and 37 are formed as bores extending radially from the axial passages 35 to the internal bore 3A of the housing. Two of the connecting passages, bores 36A and 37A, for example, extend from one axial bore 35A. One of the bores 36A extends to one of the longitudinal distributor grooves 29 of system 27 while the other of the bores 37A extends to one of the longitudinal distributor grooves 30 of system 28. The terminal ends of the bores 36A and 37A at the internal bore 3A of the housing, are angularly spaced from each other since the axial passage 35A is in continuous fluid communication only with one of the longitudinal grooves of the system 27 or 28. The axes of bores 36 and 37 as shown in FIG. 1, are disposed at an acute angle to the axis of bore 3A. As a result, the connecting passages 36 and 37 may be readily formed by utilizing drills inserted at the axial ends of the housing 3 through the internal surfaces of the bore 3A, toward an axial passage 35.

The longitudinal distributor grooves 29 and 30 of the systems 27 and 28 form slide valve surfaces 38, 39, 40 and 41 at their opposite axial ends cooperating with valve edges 44 and 45 at the intersection of the opposite axial end faces 42 and 43 of the housing 3 and the bore 3A. The foregoing arrangement of valve surfaces and edges is such that in response to axial displacement of valve element 8, upwardly as viewed in FIG. 1, fluid communication is established between grooves 29 and pressure space 8B while grooves 30 communicate with outlet port 23. Fluid communication with pressure space 8C and outlet port 22 is then blocked. Axial shift of valve element 8 in the opposite direction (downwardly as viewed in FIG. 1) will reverse the fluid connections and flow blockage, correspondingly.

What is claimed is:

1. A power steering system having a fluid metering device including intermeshing toothed stator (1) and rotor (6), a valve housing (3) fixed to the stator and formed with an internal bore (3A), a supply passage (18), ports (19, 20, 22, 23) and axial passages (35), a drive shaft (9), a torsional drive connection (15) between the drive shaft and the rotor, a controller valve including a rotatable valve element (8), means mounting the valve element for axial and angular displacement within said bore of the housing in response to rotation of the drive shaft to control flow and operation of the fluid metering device, hinge coupling means (10) connecting the valve element to the rotor for rotation thereof in response to said angular displacement, said valve element having two systems (27 and 28) of axially limited, longitudinal distributor grooves (29 and 30) formed externally thereon, said rotor and stator having fluid pockets (7) formed therebetween in fluid communication with the bore through said axial passages and the valve element, and a servomotor (26) connected to two of said ports (22, 23), said systems of distributor grooves being disposed at opposite axial ends of the valve element adjacent to said two of the ports, said housing enclosing two axial end spaces (8B, 8C) adjacent to the opposite axial ends of the valve element, said valve element enclosing an internal space (8A) through which fluid communication between the end spaces is established, one of the axial end spaces being in fluid communication with said supply passage.

2. The controller valve as defined in claim 1, including slide valve surface means (38, 39, 40, 41) formed on the valve element to limit the distributor grooves in axial length and for controlling fluid communication between the longitudinal distributor grooves and the axial end spaces and said two of the ports in response to axial displacement of the valve element within the housing.

3. The controller valve as defined in claim 1, wherein said housing has end faces (42, 43) intersecting the bore to form valve edges (44, 45) which cooperate with said slide valve surface means.

4. The controller valve as defined in claim 1, wherein said housing is formed with connecting bores (36, 37) extending radially between the bore in the housing and the axial passages at an acute angle.

5. In a controller valve assembly for a fluid power operated system, having a housing (3) formed with an internal bore (3A), an axial passage (35), an inlet passage (18) and outlet ports (22, 23), a tubular valve element (8) mounted in the bore, actuating means connected to the valve element for imparting axial and angular displacement thereto; valve-controlled passage means for conducting flow of pressurized fluid, including axial grooves (29, 30) formed externally on the valve element adjacent opposite axial ends thereof, and pressurized chamber means (8B, 8C) enclosed by the housing at said opposite axial ends of the valve element for fluid communication with the inlet passage (18), and slide valve surface means (38, 39, 40 41, 44, 45) formed at said opposite axial ends of the valve element between the grooves and the pressurized chamber means for controlling said flow of the pressurized fluid to the outlet ports (22, 23) in response to said axial displacement of the valve element.

6. The controller valve assembly as defined in claim 5 wherein said grooves are axially spaced from the axial ends of the valve element by the slide valve surface means.

7. The controller valve assembly as defined in claim 5 wherein said passage means further includes connecting bores (36, 37) extending radially through the housing at an acute angle between the grooves and the axial passage.

8. In a fluid power steering system having a source of pressurized fluid (17), a fluid metering device (1–6), a servomotor (26), controller valve means for conducting flow of the pressurized fluid between the source and the servomotor through the metering device, including a valve housing (3), a tubular valve element having opposite axial end portions enclosed in the housing, valve actuating drive means (9, 13, 14) operatively connected to the valve element for imparting axial and angular displacement thereto, passage means in the valve housing and the valve element for controlling said flow of the fluid in response to said axial displacement of the valve element, and torsional coupling means operatively connecting the fluid metering device to the valve element for controlling operation of the metering device in response to said angular displacement of the valve element, the improvement residing in means for enhancing end bearing support of the valve element in the housing at said opposite axial end portions, including pressure spaces (8B, 8C) formed in the housing into which the axial end portions of the valve element extend, and means for establishing fluid communication between said pressure spaces and the passage means including distributor grooves (29, 30) formed externally in the valve element at said axial end portions thereof.

* * * * *